UNITED STATES PATENT OFFICE.

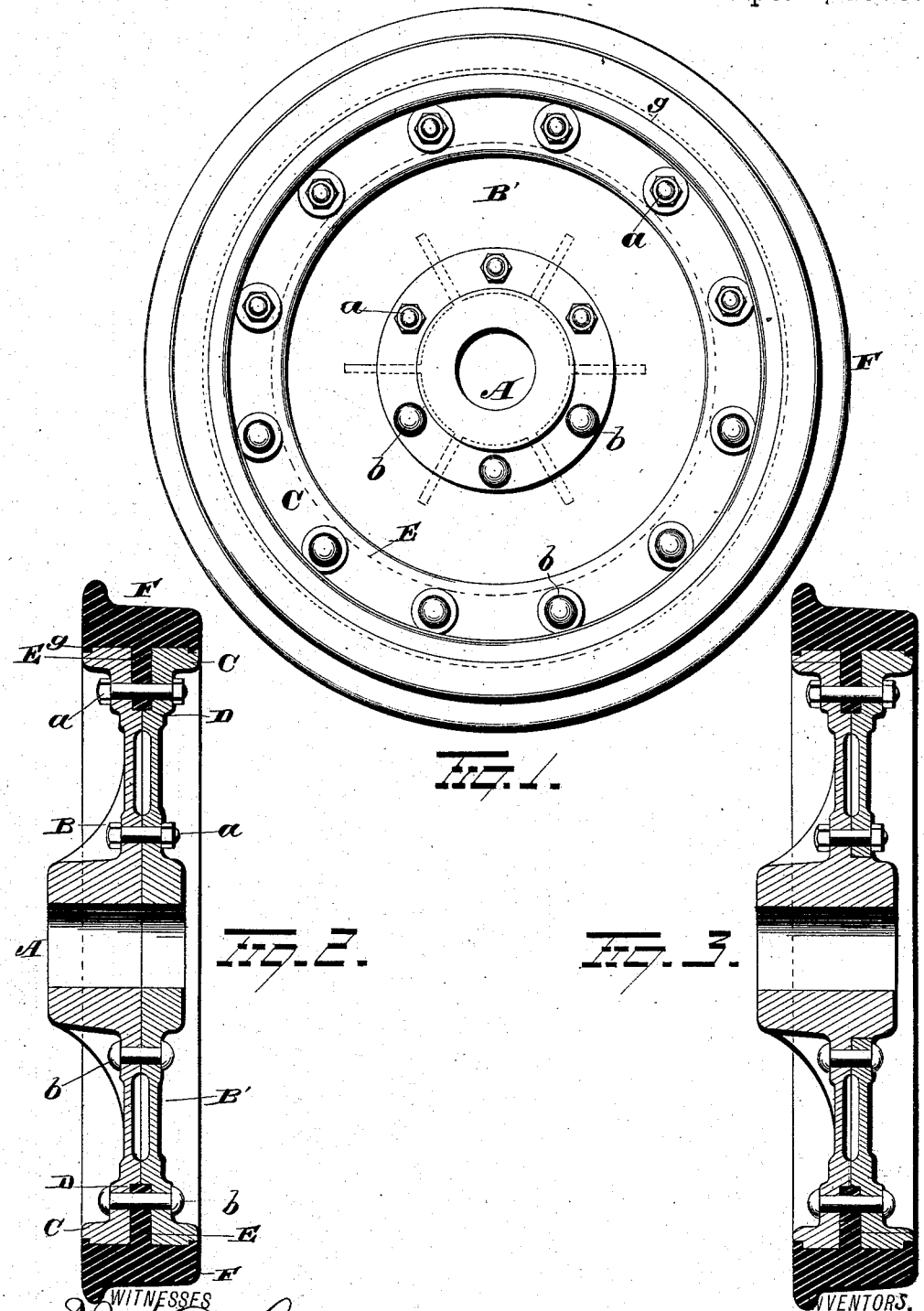

LUTHER A. ROBY AND SAMUEL T. WELLMAN, OF CLEVELAND, OHIO.

CAR-WHEEL.

SPECIFICATION forming part of Letters Patent No. 284,330, dated September 4, 1883.

Application filed February 16, 1883. (No model.)

*To all whom it may concern:*

Be it known that we, L. A. ROBY and S. T. WELLMAN, of Cleveland, in the county of Cuyahoga and State of Ohio, have invented certain new and useful Improvements in Railroad-Car Wheels; and we do hereby declare the following to be a full, clear, and exact description of the invention, such as will enable others skilled in the art to which it pertains to make and use the same.

Our invention relates to an improvement in railroad-car wheels, the object of the same being to provide improved means for securing together the parts of a sectional car-wheel; and with this end in view our invention consists in the parts and combinations of parts, as will be more fully described and claimed.

In the accompanying drawings, Figure 1 is a view in elevation of our improved wheel. Fig. 2 is a transverse sectional view of the same, and Fig. 3 is a similar view of a modified form of wheel.

The body of the wheel A is formed by the union of two soft-steel cast plates, B B', which latter, when secured together by bolts $a$ or rivets $b$, form the hub of the wheel and constitute, respectively, the inner and outer faces thereof. These plates B B' are so formed as to abut against each other at one or more points for the purpose of enabling them to be securely fastened together without any danger of straining, and are each provided with an outwardly-turned flange, C, to form the rim of the wheel. When the two plates B B' are secured together, an annular channel, D, is formed, in which the internal flange, E, of the tire F rests. This tire F is formed of hard steel in the usual manner, and is provided on its side edges with the inwardly-projecting tongues $g$, adapted to rest in corresponding grooves formed in the plates B B', for the purpose of securely holding the plates and tire together in case the bolts or rivets should be accidentally broken or lost.

In constructing one of our improved wheels, the plates B B' are first turned on the outside to fit the inside of the finished tire, proper allowance being made for shrinkage. The tire, which has been previously trued, is now heated, which causes it to expand sufficiently to enable the rims or flanges of the plates B B' to pass the tongues $g$ without difficulty, after which it is allowed to cool. After the tire has shrunk to its normal size the plates B B' are locked in position by the tongues $g$. The holes for strengthening bolts or rivets are then drilled and the bolts or rivets inserted in place, the outer series of which pass through the inwardly-projecting flange of the tire, and prevents the tire from turning or changing its position on the plates in case it should expand on becoming highly heated by the friction of the brake-shoes.

The modified form shown in Fig. 3 is substantially the same as the wheel shown in Figs. 1 and 2, the difference being simply in the formation of the hub. In the first instance the hub is sectional and is formed by the union of the two plates, while in this case the complete hub is formed integral with the inner plate, while the outer plate is provided with a central opening for the passage of the outer end of the hub. In this construction the parts are secured together by bolts or rivets as desired.

This improved wheel is simple in construction, is durable in use, and can be manufactured at a small initial cost.

It is evident that slight changes in the construction of the several parts might be resorted to without departing from the spirit of our invention; and hence we would have it understood that we do not limit ourselves to the exact construction of parts shown and described, but consider ourselves at liberty to make such changes as fairly fall within the spirit and scope of our invention.

Having fully described our invention, what we claim as new, and desire to secure by Letters Patent, is—

1. In a car-wheel, the combination, with the tire constructed with an inwardly-projecting flange, of a cast-steel body composed of two plates constructed to form a peripheral groove for the reception of the flange on the tire, said plates being constructed to have their adjacent faces abut against each other near the hub and near the flange of the tire, and two rows of fastening-bolts, the inner row extending through the two plates near the hub and the outer row extending through the plates and tire-flange, substantially as set forth.

2. The combination, with the body formed of two cast-steel plates, the latter having outwardly-turned flanges, which form the rim, and provided centrally with a peripheral groove or channel, of the tire having an inwardly-projecting flange adapted to rest in the channel or groove and two tongues adapted to rest in corresponding depressions formed in the flanges of the body.

In testimony whereof we have signed this specification in the presence of two subscribing witnesses.

LUTHER A. ROBY.
SAMUEL T. WELLMAN.

Witnesses:
W. H. SHEPARD,
T. H. BROOKS.